United States Patent [19]

Kashio

[11] Patent Number: 4,634,486

[45] Date of Patent: Jan. 6, 1987

[54] UPHOLSTERY MATERIAL FOR SEATS AND METHOD OF MAKING THE SAME

[75] Inventor: Yoshiaki Kashio, Saitama, Japan

[73] Assignee: Honda Giken Kogyo Kabushiki Kaisha, Minato, Japan

[21] Appl. No.: 778,032

[22] Filed: Sep. 20, 1985

[30] Foreign Application Priority Data

Sep. 20, 1984 [JP] Japan .......................... 59-142648[U]

[51] Int. Cl.$^4$ .......................... B32B 31/20; B32B 3/26
[52] U.S. Cl. .................................. 156/253; 29/91.1; 156/250; 156/257; 156/308.2; 156/308.4; 156/309.6; 428/71; 428/76; 428/172; 428/195
[58] Field of Search ............... 428/68, 71, 178, 195, 428/166; 156/250, 253, 257, 308.2, 308.4, 309.6; 29/91, 91.1; 297/456, 455

[56] References Cited

U.S. PATENT DOCUMENTS

| | | | |
|---|---|---|---|
| 2,946,713 | 7/1960 | Dusina et al. | 156/308.4 |
| 3,293,671 | 12/1966 | Griffin | 297/455 |
| 4,040,881 | 8/1977 | Wallace | 29/91.1 |
| 4,378,396 | 3/1983 | Ural | 428/198 |

FOREIGN PATENT DOCUMENTS 34-13919  4/1959  Japan .

Primary Examiner—Paul J. Thibodeau
Attorney, Agent, or Firm—Armstrong, Nikaido, Marmelstein & Kubovcik

[57] ABSTRACT

An upholstery material for use on a seat, includes an intermediate resilient member composed of a plurality of sheet-like or block-shaped resilient bodies having different thicknesses and arranged in order of thickness, a face sheet covering one surface of the intermediate resilient member, and a back surface covering the opposite surface of the intermediate resilient member, the face and back sheets being joined to each other through gaps between the resilient bodies. A method of making such an upholstery material is also disclosed.

4 Claims, 6 Drawing Figures

UPHOLSTERY MATERIAL FOR SEATS AND METHOD OF MAKING THE SAME

BACKGROUND OF THE INVENTION

The present invention relates to an upholstery material for use on motor vehicle seats and a method of making the same.

Some upholstery materials used on passenger's seats in motor vehicles comprise blocks for better cushioning capability.

For example, Japanese Utility Model Publication No. 59-13919 published on Apr. 24, 1984 discloses an upholstery material composed of a sheet core and a pluraltiy of block cores disposed at spaced intervals on the sheet core. The block cores are covered with a face sheet and the sheet-like core is covered with a back sheet, the face and back sheets being stitched to each other at spacings between the block cores.

However, the above conventional upholstery material has been problematic in that since the block cores are of the same thickness, the user seated on the seat feels somewhat uncomfortable, and the rate of production of upholstered seats is poor because the number of manufacturing steps involved is increased due to the required steps of bonding the block cores to the sheet core and stitching the face and back sheets to each other.

The present invention has been made in an effort to solve the aforesaid drawbacks of the conventional upholstery material.

SUMMARY OF THE INVENTION

It is an object of the present invention to provide an upholstery material having areas of different cushioning abilities for improved riding comfort.

Another object of the present invention is to provide a method of manufacturing such an upholstery material simply, easily, and inexpensively in complex shapes.

According to the present invention, there is provided an upholstery material for use on a seat, comprising an intermediate resilient member composed of a plurality of sheet-like or block-shaped resilient bodies having different thicknesses and arranged in order of thickness, a face sheet covering one surface of the intermediate resilient member, and a back surface covering the opposite surface of the intermediate resilient member, the face and back sheets being joined to each other through gaps between the resilient bodies.

According to the present invention, there is also disclosed a method of manufacturing an upholstery material for use on a seat, comprising the steps of positioning a back sheet on a base table, forming and positioning a staircase-shaped resilient base member having step portions of different thicknesses on the back sheet with the stepped surface directed upwardly, positioning a face sheet on the resilient base member, and fusing the face and back sheets by pressing a welder having fusing blades aligned with the stepped end faces of the resilient base member against the resilient base member through the face sheet to fuse the face and back sheets to each other with the fusing blades through the resilient base member.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
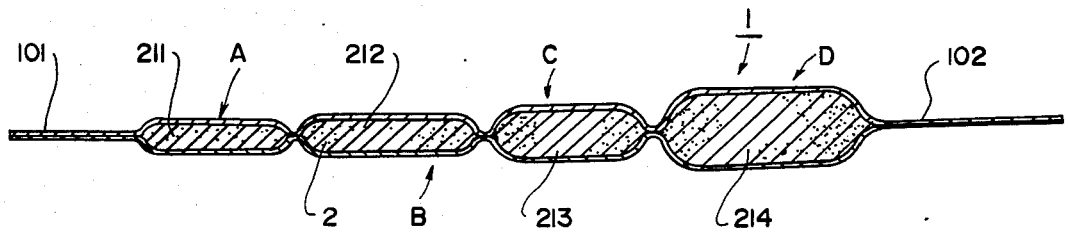
FIG. 1 is a longitudinal cross-sectional view of an upholstery material according to an embodiment of the present invention.

FIG. 1 shows an upholstery material 1 according to the present invention. The upholstery material 1 includes an intermediate resilient member 2 composed of sheet-like or block-shaped resilient bodies 211, 212, 213, 214 having different thicknesses and arranged in order of thickness. The face and back of the intermediate resilient member 2 are covered with a face sheet 4 and a back sheet 3 (FIG. 3) which are joined together to make the resilient bodies 211, 212, 213, 214 discrete and independent of each other. The intermediate resilient member 2 may be made of a wadding material such as sponge. The face and back sheets 4, 3 may comprise sheets of synthetic resin.

The process of making the upholstery material 1 will hereinafter be described with reference to FIGS. 2 and 3.

Figure 2:
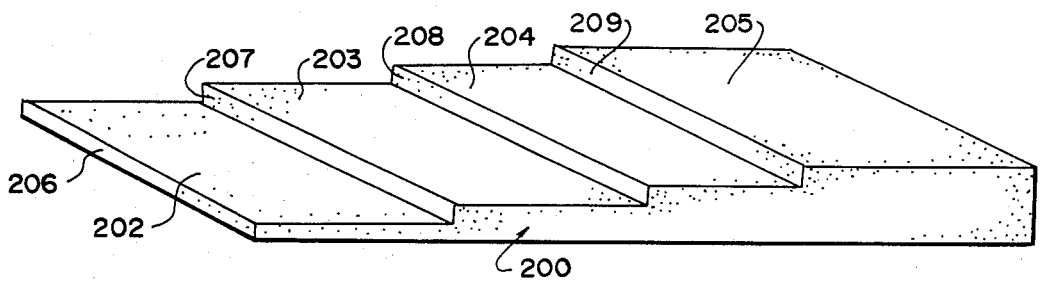
FIG. 2 is a perspective view of a base member which will be formed into an intermediate resilient member in the upholstery material shown in FIG. 1.

FIG. 2 illustrates an integral elongated resilient base member 200 which will be formed into the intermediate resilient member 2. The base member 200 has a flat bottom 201 (FIG. 3) and an upper surface which is stepped successively from a front end to a rear end to provide four different thicknesses for the base member 200. More specifically, the base member 200 has a first step portion 202 closest to the front end thereof and having a smallest thickness $t_1$, second step portion 203 joined to the first portion 202 and having a thickness $t_2$ larger than the thickness $t_1$, a third step portion 204 joined to the second step portion 203 and having a thickness $t_3$ larger than the thickness $t_2$, and a fourth step portion 205 closest to the rear end of the base member 200 and joined to the third step portion 204, the fourth step portion 205 having a largest thickness $t_4$ larger than the thickness $t_3$. The upper surface of the base member 200 is therefore composed of the four successive step portions 202 through 205 of successively increasing thicknesses, each of the step portions 202 through 205 being of a prescribed length in the longitudinal direction of the base member 200. Thus, the base member 200 as a whole is in the form of a staircase.

Figure 3:
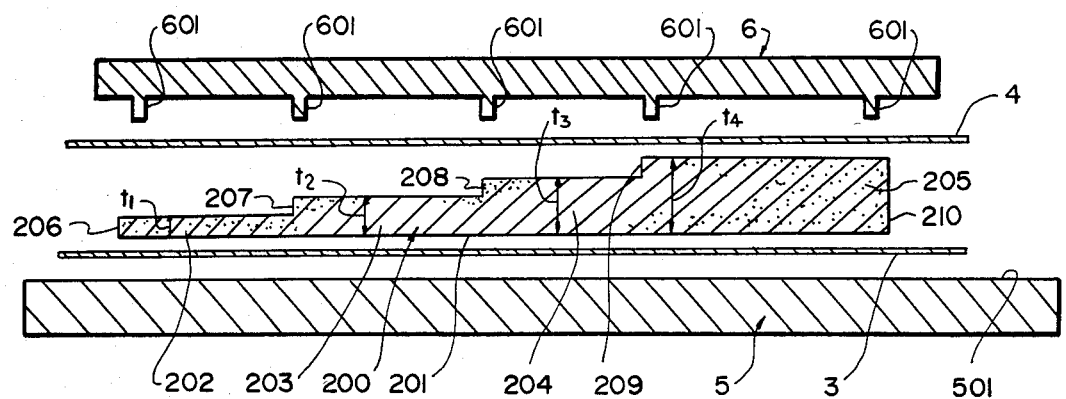
FIG. 3 is a longitudinal cross-sectional view explanatory of a process of making the upholstery material of FIG. 1.

In FIG. 3, the base member 200 is positioned over the back sheet 3 of synthetic resin with the flat bottom 201 directed downwardly or the stepped surface upwardly, and placed on the upper surface 501 of a base table 5. The base member 200 is covered with the face sheet 4 of synthetic resin, with a welder 6 positioned above the face sheet 4. The welder 6 has a plurality of fusing blades 601 projecting downwardly from the lower surface thereof at spaced intervals. The fusing blades 601 are vertically aligned with the front end face 206 of the first portion 202 of the base member 200, the stepped front end face 207 of the second portion 203, the stepped front end face 208 of the third portion 204, the stepped front end face 209 of the fourth portion 205, and the rear end face of the fourth portion 205, respectively.

In operation, the welder 6 is lowered to press the face sheet 4 with the blades 601 in order to cut off the base member 200 at the end faces 206 through 209 between the face and back sheets 4, 3 and to fuse or join the face and back sheets 4, 3 to the base member 200 and also to each other through the severed gaps of the base member 200. Therefore, the base member 200 is formed into the independent block-shaped resilient bodies 211, 212, 213, 214 of different thicknesses which are sealed and held in spaces 101 through 104, respectively, defined between the joined face and back sheets 4, 3. The block-shaped resilient bodies 211, 212, 213, 214 covered with the face and back sheets 4, 3 serve as successive independent cushioning units A, B, C, D, respectively, having different thicknesses, with the face and back sheets 4, 3 being continuous over the cushioning units A, B, C, D. The upholstery material 1 is thus completed.

Figure 6:
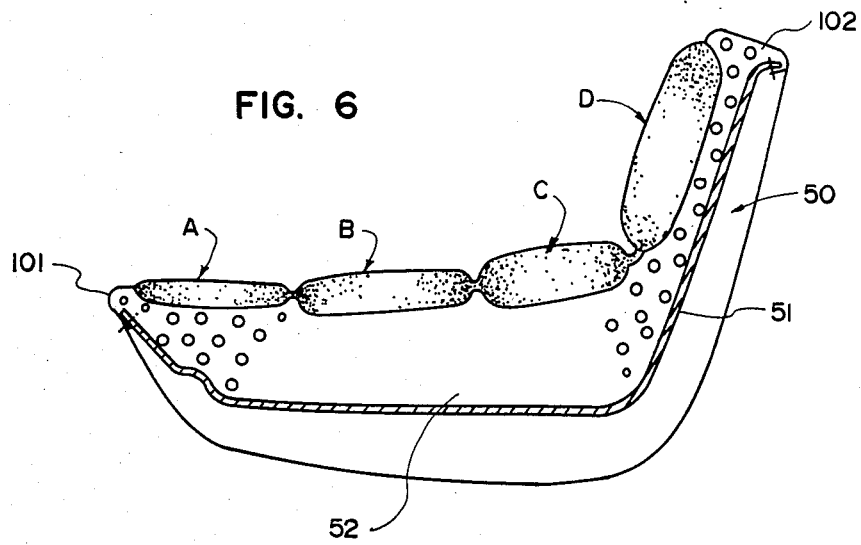
FIG. 6 is a longitudinal cross-sectional view of a seat employing the upholstery material of the present invention.

FIG. 6 shows a seat 50 employing the upholstery material 1. The seat 50 is composed of a seat base 51 of a substantially L shape to which an L-shaped base material 52 is bonded. The upholstery material 1 is then bonded to the exposed surface of the base material 52, and has its front and rear flaps 101, 102 fastened to the front and rear ends, respectively, of the seat base 51. When the user is seated on the seat 50, the thinnest cushioning unit A is positioned below the front portions of the thighs of the user, the thicker cushioning unit B is positioned below the rear portions of the thighs, and the thicker cushioning unit C is positioned below the buttocks of the user. The thickest cushioning unit A is held against the back of the waist of the user seated on the seat 50. Therefore, the seat 50 has desired cushioning characteristics for resiliently supporting the different portions of the user's body.

Figure 4:
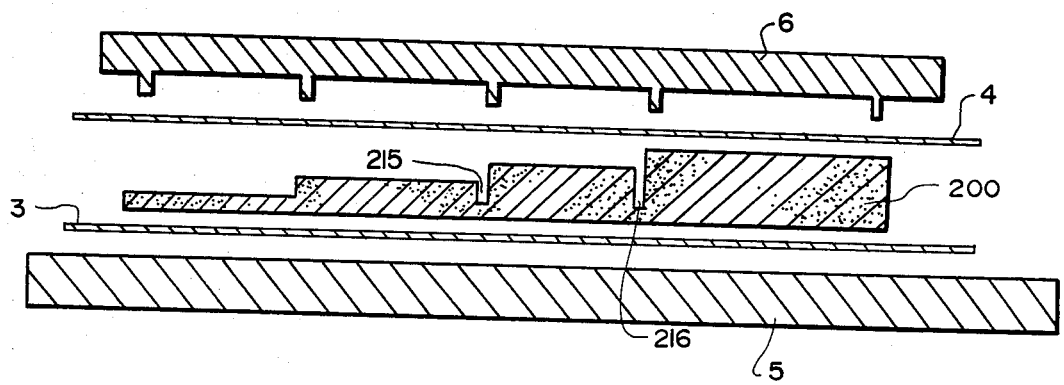
FIGS. 4 and 5 are longitudinal cross-sectional views of other processes of making the upholstery material according to the present invention.

FIG. 4 is illustrative of a modification of the resilient base member 200. The resilient base member 200 has grooves 215, 216 defined between thicker stepped portions thereof. The slots 215, 216 allow the blades of the welder 6 to cut off the base member 200 and to join the face and back sheets 4, 3 with greater ease.

Figure 5:
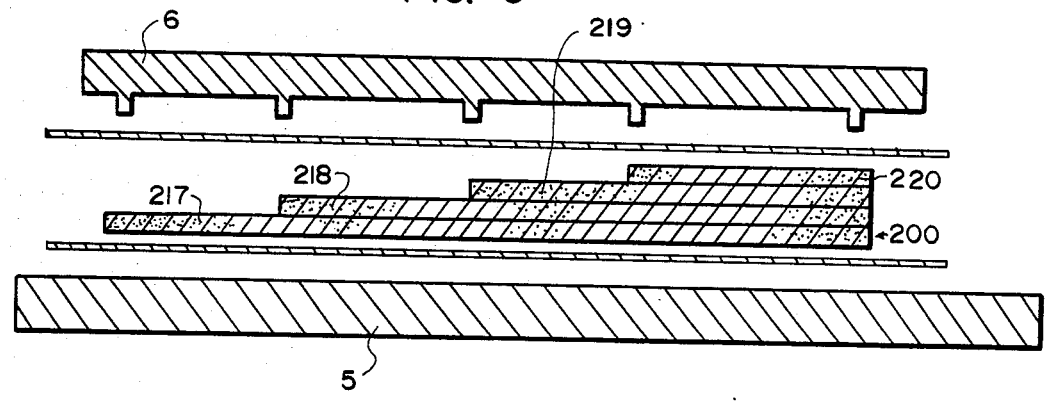

FIG. 5 shows another modification of the resilient base member 200. The modified resilient base member 200 is of a staircase-shaped laminated structure which is produced by stacking and bonding four resilient sheets 217, 218, 219, 220 of different lengths with their rear ends lying flush with each other.

While in the illustrated embodiments the intermediate resilient member 2 or the resilient base member 200 have four resilient bodies or four stepped portions, it may have a different number of resilient bodies or stepped portions. The thicknesses of the resilient bodies or stepped portions may be selected as desired to achieve desired seat cushioning characteristics.

The upholstery material for use on seats according to the present invention is advantageous in that since its block-shaped cushioning units have different thicknesses to provide optimum cushioning characteristics for the seat, the upholstery material can give the user a better degree of riding comfort. According to the method of the invention, the resilient base member which is integral and continuous can easily be formed into the independent resilient bodies. Since the single resilient base member is formed into the separate resilient bodies, the upholstery material can be manufactured at a reduced cost. Inasmuch as the face and back sheets can be joined simultaneously to the resilient base member, the rate of production of the upholstery material is increased and complex upholstery designs can easily be produced.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. The method of manufacturing an upholstery material composed of a plurality of sheet-like block-shaped resilient bodies having different thicknesses enclosed between a face sheet and a back sheet comprising the steps of:

forming an integral continuous staircase-shaped resilient base member having an elongaed flat base and step portions of different thicknesses forming stepped end faces;

positioning a flat back sheet on a base table;

positioning said base member on said back sheet with the stepped portions directed upwardly;

positioning a flat face sheet on top of said resilient base member; and fusing said face sheet to said back sheet by pressing a welder having fusing blades aligned with stepped end faces of said resilient base member against said resilient face member through said face sheet to fuse said face sheet and said back sheet to each other, thereby forming said resilient bodies having different thicknesses between said face sheet and said back sheet.

2. The method recited in claim 1, wherein said staircase-shaped resilient base member is formed with grooves at said stepped end faces.

3. The method recited in claim 1, wherein said staircase-shaped resilient base member is formed at a laminated structure composed of a plurality of stacked sheets of resilient material of different lengths.

4. The method recited in claim 1, wherein said upholstery material is for use on a seat and said integral continuous staircase-shaped resilient base member is substantially the length of said seat.

* * * * *